UNITED STATES PATENT OFFICE.

EDWARD F. KELLEY, OF BRIDGEPORT, CONNECTICUT, ASSIGNOR TO THE ROYAL EQUIPMENT COMPANY, OF BRIDGEPORT, CONNECTICUT, A CORPORATION OF CONNECTICUT.

FRICTION-LINING.

1,162,371.      Specification of Letters Patent.      Patented Nov. 30, 1915.

No Drawing.      Application filed June 25, 1915. Serial No. 36,328.

*To all whom it may concern:*

Be it known that I, EDWARD F. KELLEY, a citizen of the United States, residing at Bridgeport, county of Fairfield, State of Connecticut, have invented an Improvement in Friction-Linings, of which the following is a specification.

This invention has for its object to provide a heat-proof, water-proof and oil-proof friction material of great wear resisting qualities, which shall be adapted for general uses where a high coefficient of friction is required and is especially adapted for use for linings, pads, shoes, bands, etc. in brakes and clutches, also for packings, gaskets and conveying belts where the temperature is high.

In carrying out the invention, asbestos—ordinarily woven,—in strips, sheets or pieces of any required thickness and shape, and either with or without wire, is saturated in a mixture comprising the following ingredients: Decoction of ground bone,—one gallon. Ale or beer, or beer or malt vinegar,—two gallons. Alum, preferably ferric alum,—twenty to seventy ounces. Epsom salts (sulfate of magnesia)—fifty to one hundred ounces.

The decoction of ground bone should have a specific gravity of 1.01 to 1.02. A suitable decoction may be made by boiling three pounds of ground bone in five gallons of water. The same bone may be subjected to repeated boilings, either with or without the addition of fresh bone, so long as a decoction having a sufficiently high specific gravity is produced. To one gallon of the decoction of ground bone I add two gallons of either ale or beer, or beer or malt vinegar. I ordinarily use beer or malt vinegar on account of its cheapness, it being a waste product of breweries, but if beer vinegar is not available or in preparing a small quantity of the mixture, either ale or beer may be used with equally good results. The decoction of ground bone and the beer or malt vinegar are ordinarily heated together and the other ingredients dissolved therein. When the material to be treated is relatively thick and is to be subjected to hard wear, the highest proportions stated of alum and epsom salts may be used. An entirely satisfactory mixture for ordinary use may be made by using forty ounces of alum and eighty-five to ninety ounces of epsom salts. Should there be a precipitation, the residue may be used again. In making friction rings for use in clutches and for various other uses where the material is relatively thin, less alum and epsom salts may be used, even as low as twenty ounces of alum and fifty ounces of epsom salts to one gallon of the ground bone decoction and two gallons of ale, beer, or beer or malt vinegar, and the mixture need not necessarily be heated. For brake linings, and whenever the material is relatively thick or is to be subjected to hard wear, the amount of alum and epsom salts is increased and as much of each may be used as will be taken up by the proper proportions of the ground bone decoction and ale, beer, or beer or malt vinegar. The asbestos, woven or unwoven, is thoroughly saturated with the mixture and is then dried in any suitable manner, as in a muffle or by being passed over hot plates.

Having thus described my invention I claim:—

1. The herein described material comprising asbestos impregnated with a mixture of alum and epsom salts, dissolved in a mixture of decoction of ground bone and beer vinegar.

2. The herein described material comprising woven asbestos impregnated with a mixture of alum and epsom salts, dissolved in a mixture of decoction of ground bone and beer vinegar.

3. A material of the character described consisting of fabricated asbestos having incorporated therewith alum and epsom salts dissolved in a mixture of decoction of ground bone and beer vinegar and having a friction producing and wear resisting character.

4. The herein described material comprising asbestos impregnated with a mixture of alum and epsom salts dissolved in a heated mixture of decoction of ground bone and beer vinegar.

In testimony whereof I affix my signature.

EDWARD F. KELLEY.